(12) United States Patent
Ekelin et al.

(10) Patent No.: US 7,778,179 B2
(45) Date of Patent: Aug. 17, 2010

(54) USING FILTERING AND ACTIVE PROBING TO EVALUATE A DATA TRANSFER PATH

(75) Inventors: Svante Ekelin, Vallentuna (SE); Martin Nilsson, Solna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 811 days.

(21) Appl. No.: 11/285,723

(22) Filed: Nov. 23, 2005

(65) Prior Publication Data

US 2007/0115849 A1 May 24, 2007

(51) Int. Cl.
*H04J 1/16* (2006.01)
(52) U.S. Cl. .................. 370/235; 370/248; 370/252; 370/352
(58) Field of Classification Search ................ 370/468, 370/252, 230, 235, 352, 248
See application file for complete search history.

(56) References Cited

U.S. PATENT DOCUMENTS

| | | | | |
|---|---|---|---|---|
| 6,011,776 A * | 1/2000 | Berthaud et al. | ............ | 370/232 |
| 6,272,539 B1 * | 8/2001 | Cuomo et al. | ............... | 709/223 |
| 6,363,056 B1 * | 3/2002 | Beigi et al. | ................. | 370/252 |
| 6,430,160 B1 * | 8/2002 | Smith et al. | ................. | 370/252 |
| 6,614,763 B1 * | 9/2003 | Kikuchi et al. | ............. | 370/252 |
| 6,721,334 B1 * | 4/2004 | Ketcham | ................... | 370/473 |
| 6,813,244 B1 * | 11/2004 | He et al. | ....................... | 370/235 |
| 6,839,754 B2 * | 1/2005 | Nowak et al. | ............... | 709/224 |
| 7,127,508 B2 * | 10/2006 | Edmison et al. | ............ | 709/224 |
| 7,130,268 B2 * | 10/2006 | Mascolo | ..................... | 370/232 |
| 7,133,368 B2 * | 11/2006 | Zhang et al. | ................ | 370/249 |
| 7,180,858 B1 * | 2/2007 | Roy et al. | .................... | 370/232 |
| 7,299,280 B2 * | 11/2007 | Gerla et al. | ................. | 709/224 |
| 7,436,772 B2 * | 10/2008 | Padhye et al. | ............... | 370/235 |
| 7,545,749 B2 * | 6/2009 | Jourdain et al. | ............ | 370/252 |
| 7,660,261 B2 * | 2/2010 | Keromytis et al. | ......... | 370/252 |
| 2002/0085587 A1 * | 7/2002 | Mascolo | ..................... | 370/477 |
| 2003/0076840 A1 * | 4/2003 | Rajagopal et al. | ...... | 370/395.21 |
| 2003/0204621 A1 * | 10/2003 | Poletto et al. | .............. | 709/239 |
| 2004/0243335 A1 * | 12/2004 | Gunawardena et al. | ..... | 702/116 |
| 2006/0114834 A1 * | 6/2006 | Cheung et al. | .............. | 370/252 |
| 2006/0182039 A1 * | 8/2006 | Jourdain et al. | ............ | 370/252 |
| 2007/0081459 A1 * | 4/2007 | Segel et al. | ................. | 370/230 |
| 2007/0115814 A1 * | 5/2007 | Gerla et al. | ................. | 370/230 |
| 2007/0242616 A1 * | 10/2007 | Chang et al. | ................ | 370/252 |
| 2008/0137540 A1 * | 6/2008 | Botvich | ...................... | 370/241 |

OTHER PUBLICATIONS

G. Bishop, and G. Welch, "An Introduction to the Kalman Filter", SIGGRAPH 2001, Course 8.
K. Jacobsson, H. Hjalmarsson, N. Möller and K H Johansson, "Estimation of RTT and bandwidth for congestion control applications in communication networks", in IEEE Conference on Decision and Control (CDC) 2004 Proceedings, Paradise Island, Bahamas, 2004.
M. Jain and C. Dovrolis, "Pathload: a measurement tool for end-to-end available bandwidth". In Proc. of Passive and Active Measurement workshop (PAM), 2002.

(Continued)

*Primary Examiner*—Ricky Ngo
*Assistant Examiner*—Dewanda Samuel

(57) ABSTRACT

If a condition in a data transfer path is modeled appropriately, then a filter-based approach can be used to provide an estimate of the condition. This permits accurate, real-time estimates of the condition with modest requirements for data processing and memory resources.

10 Claims, 3 Drawing Sheets

OTHER PUBLICATIONS

M. Jain and C. Dovrolis, "End-to-end Available Bandwidth: Measurement Methodology, Dynamics, and Relation with TCP Throughput". In Proc. of ACM Sigcomm, 2002.

S. Keshav, A control-theoretic approach to flow control. In Proceedings of ACM Sigcomm'91, pp. 3-15, Zurich, Switzerland, Sep. 1991.

M. Kim and B. Noble, "SANE: stable agile network estimation". University of Michigan Department of Electrical Engineering and Computer Science. CSE-TR-432-00. 2000.

M. Kim and B. Noble, "Mobile network estimation", Mobile Computing and Networking (ACM MOBICOM), Rome, Italy, 2001.

B. Melander, M. Björkman, and P. Gunningberg, "A new end-to-end probing and analysis method for estimating bandwidth bottlenecks", Proceedings of IEEE Globecomm '00, San Francisco, USA, Nov. 2000.

A. Pásztor and D. Veitch, "The packet size dependence of packet-pair like methods", in Proceedings, Tenth International Workshop on Quality of Service (IWQoS 2002), Miami Beach, USA, May 2002.

V. Ribeiro, R. Riedi, R. Baraniuk, J. Navratil, L. Cottrell, "pathChirp: Efficient Available Bandwidth Estimation for Network Paths", in Proc. of Passive and Active Measurement workshop (PAM), 2003.

A. Shriram, M. Murray, Y. Hyun, N. Brownlee, A. Broido, M. Fomenkov and KC Claffy, "Comparison of Public End-to-End Bandwidth Estimation Tools on High-Speed Links", in Passive and Active Measurement workshop (PAM), 2005.

M. J. Coates and R. D. Nowak. "Sequential Monte Carlo inference of internal delays in nonstationary data networks", IEEE Transactions on Signal Processing, 50(2):366-376, Feb. 2002.

S. Ekelin and M. Nilsson, "Continuous monitoring of available bandwidth over a network path", $2^{nd}$ Swedish National Computer Networking Workshop, Karlstad, Sweden, Nov. 23-24, 2004.

Prasad, R., Murray, M., Dovrolis, C., Claffy, K C.: Bandwidth Estimation: Metrics, Measurement Techniques, and Tools. In: IEEE Network Magazine (2003).

Ekelin, S. et al.: "The Failure of 'The Failure of Poisson Modeling' for Internet Bandwidth Measurements," Jun. 14-16, 2005.

* cited by examiner

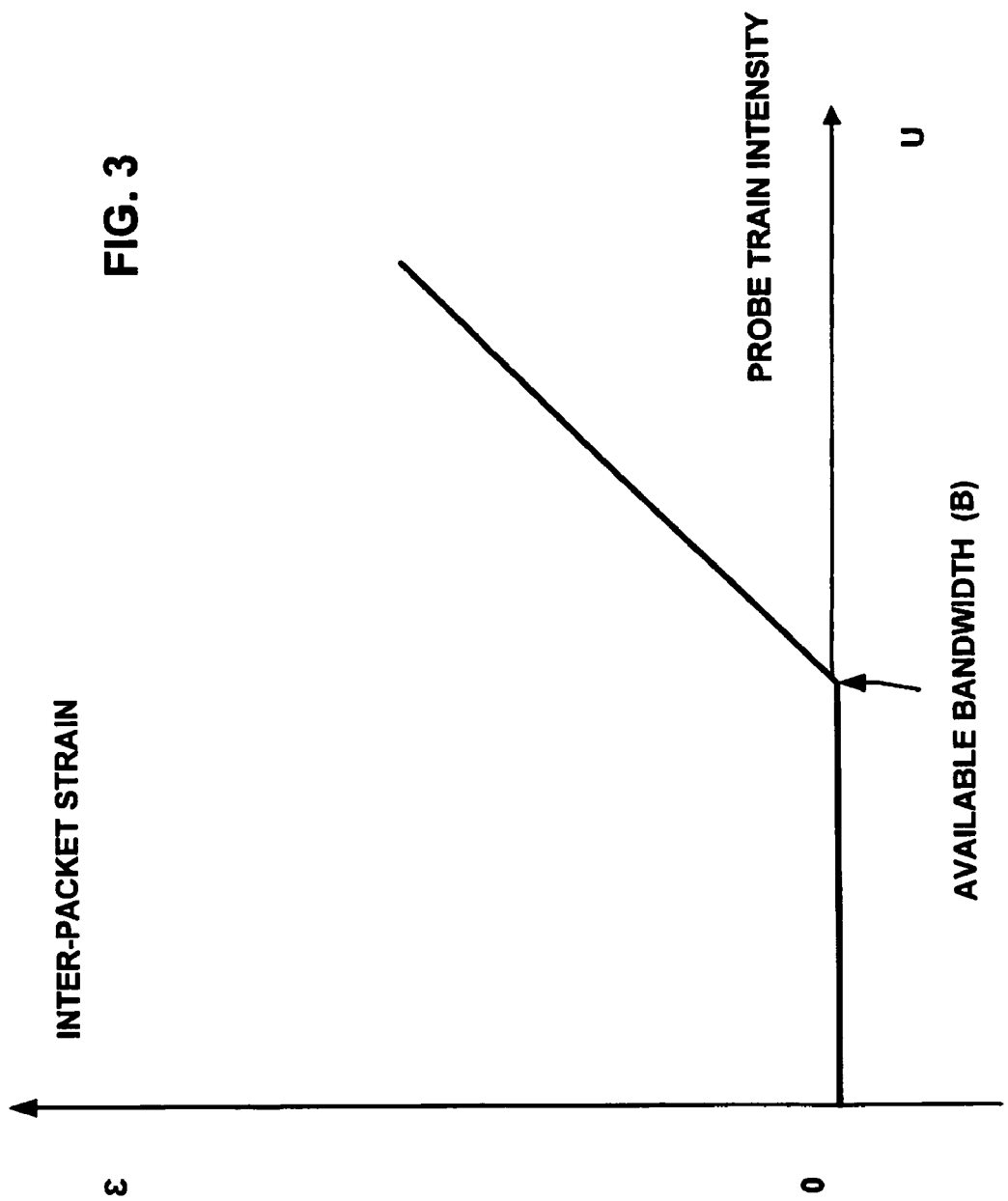

USING FILTERING AND ACTIVE PROBING TO EVALUATE A DATA TRANSFER PATH

FIELD OF THE INVENTION

The invention relates generally to data networks and, more particularly, to evaluation of data transfer paths in data networks.

BACKGROUND OF THE INVENTION

The documents listed below are incorporated herein by reference:

G. Bishop, and G. Welch, "An Introduction to the Kalman Filter", SIGGRAPH 2001, Course 8.

K. Jacobsson, H. Hjalmarsson, N. Möller and K H Johansson, "Estimation of RTT and bandwidth for congestion control applications in communication networks", in *IEEE Conference on Decision and Control (CDC) 2004 Proceedings*, Paradise Island, Bahamas, 2004.

M. Jain and C. Dovrolis, "Pathload: a measurement tool for end-to-end available bandwidth". In Proc. of Passive and Active Measurement workshop (PAM), 2002.

M. Jain and C. Dovrolis, "End-to-end Available Bandwidth: Measurement Methodology, Dynamics, and Relation with TCP Throughput". In Proc. of ACM Sigcomm, 2002.

S. Keshav, A control-theoretic approach to flow control. In Proceedings of ACM SIGCOMM'91, pages 3-15, Zurich, Switzerland, September 1991.

M. Kim and B. Noble, "SANE: stable agile network estimation", University of Michigan Department of Electrical Engineering and Computer Science. CSE-TR-432-00. 2000.

M. Kim and B. Noble, "Mobile network estimation", Mobile Computing and Networking (ACM MOBICOM), Rome, Italy, 2001.

B. Melander, M. Björkman, and P. Gunningberg, "A new end-to-end probing and analysis method for estimating bandwidth bottlenecks", Proceedings of IEEE Globecomm '00, San Francisco, USA, November 2000.

A. Pásztor and D. Veitch, "The packet size dependence of packet-pair like methods", in *Proceedings, Tenth International Workshop on Quality of Service (IWQoS 2002)*, Miami Beach, USA, May 2002.

V. Ribeiro, R. Riedi, R. Baraniuk, J, Navratil, L. Cottrell, "pathChirp: Efficient Available Bandwidth Estimation for Network Paths", in Proc. of Passive and Active Measurement workshop (PAM), 2003.

A. Shriram, M. Murray, Y. Hyun, N. Brownlee, A. Broido, M. Fomenkov and K C Claffy, "Comparison of Public End-to-End Bandwidth Estimation Tools on High-Speed Links", in Passive and Active Measurement workshop (PAM), 2005.

Nowak, R. D. and Coates, M. J., "Network tomography using closely spaced unicast packets", U.S. Pat. No. 6,839,754 (2005).

M. J. Coates and R. D. Nowak. "Sequential Monte Carlo inference of internal delays in nonstationary data networks", IEEE Transactions on Signal Processing, 50(2):366-376, February 2002.

S. Ekelin and M. Nilsson, "Continuous monitoring of available bandwidth over a network path", $2^{nd}$ Swedish National Computer Networking Workshop, Karlstad, Sweden, Nov. 23-24, 2004.

Prasad, R., Murray, M., Dovrolis, C., Claffy, K C.: Bandwidth Estimation: Metrics, Measurement Techniques, and Tools. In: IEEE Network Magazine (2003).

The capability of measuring available bandwidth end-to-end over a path in a data network is useful in several contexts, including SLA (Service Level Agreement) verification, network monitoring and server selection. Passive monitoring of available bandwidth of an end-to-end network path is possible in principle, provided all of the network nodes in the path can be accessed. However, this is typically not possible, and estimation of available end-to-end bandwidth is typically done by active probing of the network path. The available bandwidth can be estimated by injecting probe traffic into the network, and then analyzing the observed effects of cross traffic on the probes. This kind of active measurement requires access to the sender and receiver hosts (nodes) only, and does not require access to any intermediate nodes in the path between the sender and receiver.

Conventional approaches to active probing require the injection of probe packet traffic into the path of interest at a rate that is sufficient transiently to use all available bandwidth and cause congestion. If only a small number of probe packets are used, then the induced transient congestion can be absorbed by buffer queues in the nodes. Accordingly, no packet loss is caused, but rather only a small path delay increase of a few packets. The desired measure of the available bandwidth is determined based on the delay increase. Probe packets can be sent in pairs or in trains, at various probe packet rates. The probe packet rate where the path delay begins increasing corresponds to the point of congestion, and thus is indicative of the available bandwidth. Probe packets can also be sent such that the temporal separation between probe packets within a given train varies, so each train can cover a range of probe rates.

Conventional solutions such as those mentioned above either do not produce real time estimates of available bandwidth, or do not produce sufficiently accurate estimates of available bandwidth, or both. These solutions also tend to require either significant data processing resources, or significant memory resources, or both.

It is therefore desirable to provide for an active probing solution that can estimate the available bandwidth of a path in a data network without the aforementioned difficulties of conventional solutions.

SUMMARY OF THE INVENTION

Exemplary embodiments of the invention provide for modeling a condition in a data transfer path appropriately to permit the use of a filter-based approach to provide an estimate of the condition. This permits accurate, real-time estimates of the condition with modest requirements for data processing and memory resources.

BRIEF DESCRIPTION OF THE DRAWINGS

FIG. 3 graphically illustrates a piecewise linear model utilized by exemplary embodiments of the invention.

DETAILED DESCRIPTION

Figure 1:
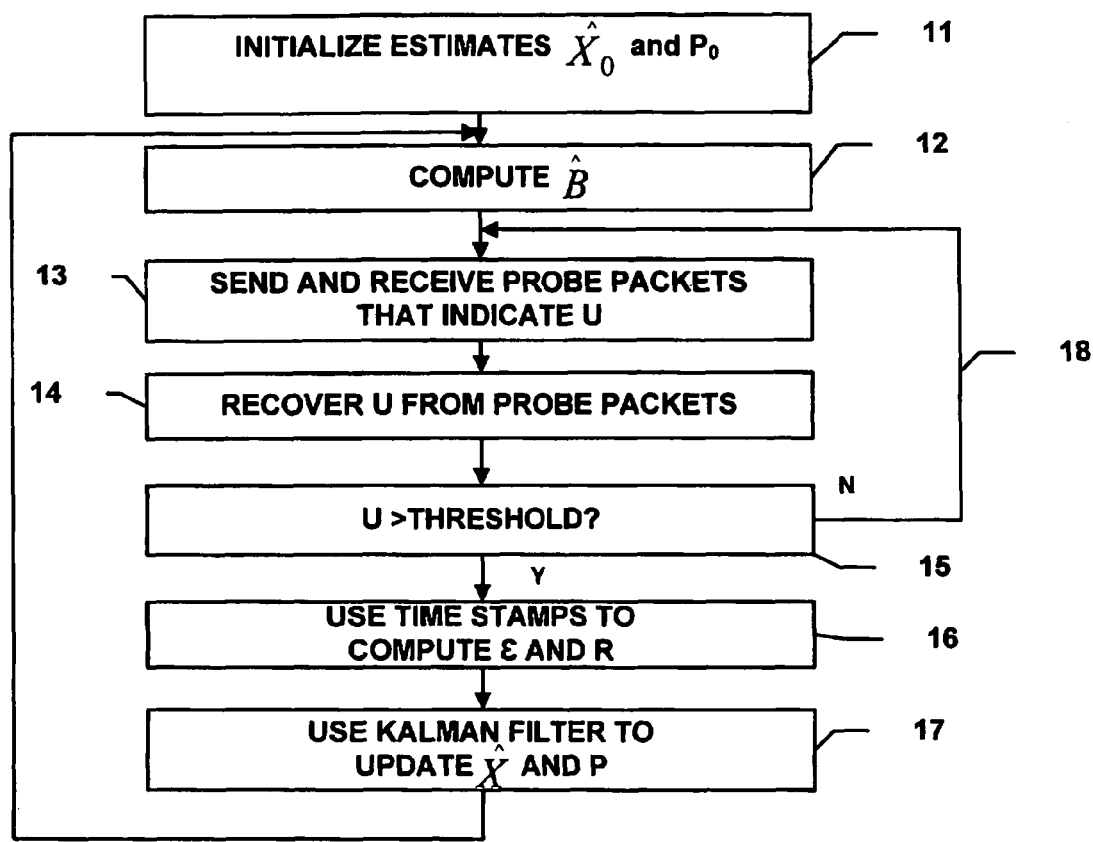
FIG. 1 illustrates exemplary operations that can be performed according to the invention.

Exemplary embodiments of the invention provide for fast and accurate estimation of a time-dependent condition associated with a packet-switched network path, for example, a path between two hosts or network nodes on the Internet or another IP network. Active probing is used in combination with filtering to estimate variables of network model related to the condition of interest. The estimate of the condition of interest is then obtained based on the estimated variables.

The properties of the network path are sampled by transmitting probe packets in a specific pattern across the network path. Their time stamps are recorded on sending and on receiving, providing a measurement of a quantity related to the network model variables. This is repeated over and over again, for as long as it is desired to keep track of the condition of interest.

The use of filtering enables real-time estimation. For each new measurement obtained by sampling the system, a new estimate of the network model variable(s) is calculated from the previous estimate and the new measurement. This in turn allows for the production of an updated estimate (i.e., the new estimate) of the condition of interest for each new sampling of the network path. The sampling (i.e., measurements) may be performed arbitrarily often, resulting in real-time responsiveness. Thus, a filter can take a previous estimate $\hat{x}_{k-1}$ of the system state and a new measurement $z_k$ as inputs, and then calculate a new estimate $\hat{x}_k$ of the system state based on those inputs. This permits the filter to produce the state variable estimates in real-time, i.e. tracking the system state.

One example of an estimating filter is the well-established Kalman filter, which is both fast and lightweight. In order to be able to apply a Kalman filter, both the system model and the measurement model need to be expressed in a linear way. That is, the new system state depends linearly on the previous system state, plus a noise term, and the measured quantity depends linearly on system state variables, plus a noise term.

Before further discussion of the filter-based approach to the estimation of system state variables, examples of a condition to be estimated and a suitable measurement technique will now be discussed.

In some embodiments of the invention, for example, the condition to be estimated is the available bandwidth of the network path. The concept of available bandwidth can be understood as follows. Each link j in a network path has a certain capacity, Cj, determined by the network interfaces in the nodes on each end of the link. The capacity Cj is simply the highest possible bit rate over the link at the packet level. The capacity typically does not vary over short time scales. However, the load, or cross traffic, on a given link j, denoted by Sj(t), does vary. The available bandwidth Bj(t) of link j is Bj(t)=Cj−Sj(t). One of links j along the path has the smallest available bandwidth. This "bottleneck link" determines the available bandwidth of the path. The available bandwidth B(t) of a network path is the minimum of the available bandwidths respectively associated with its constituent links:

$$B(t) = \min_{j}(Cj - Sj(t)).$$

The available bandwidth of a network path at any time t can thus be interpreted as the maximum increase in data rate, from sending end to receiving end, which can theoretically occur at time t without causing congestion.

It should be noted that cross traffic load and thus available bandwidth are defined using some averaging time scale tau, i.e. Sj(t) is calculated by averaging over some time interval of length tau around time t. There is no universal, natural choice of tau, rather this depends on the specifics of the application. Due to finite link capacity and cross-traffic packet size, tau may not be chosen arbitrarily small. However, for modern data networks, available bandwidth and cross traffic load could be defined using tau as low as in the sub-second region.

In some embodiments of the invention, the active probing used to sample for measurements is built on the well-known practice of transmitting pairs of time-stamped probe packets from sender to receiver. For example, a network path can be modeled as a series of hops, where each hop contains an input FIFO queue and a transmission link. Each transmission link j has a constant capacity Cj, and time-varying cross traffic. Consider a sequence of packets wherein the ith packet in the sequence arrives at a hop at time $\tau_i$, and arrives at the next hop at time $\tau_i^*$. Of interest are the inter-arrival times of the packet pairs. If each packet pair is defined to contain the (i−1)th packet and the ith packet of a sequence of packets, then the inter-arrival times of a given packet pair at the aforementioned hops are $$t_i = \tau_i - \tau_{i-1} \text{ and } t_i^* = \tau_i^* - \tau_{i-1}^*.$$

A dimensionless quantity, the inter-packet strain, is designated as $\epsilon$, and is defined by $$\frac{t_i^*}{t_i} = 1 + \varepsilon.$$

If u is the probe packet transmission rate selected for performing the measurement, if r is the rate of probe packet traffic exiting a hop, and if b is the size of the probe packets, then $$\frac{u}{r} = \frac{b/t_i}{b/t_i^*} = \frac{t_i^*}{t_i} = 1 + \varepsilon.$$

The inter-packet strain $\epsilon$ can thus be seen to provide an indication of the relationship between the probe traffic rate u and the available bandwidth B. If u is less than B, then $\epsilon=0$, and there is no congestion. However, if u reaches B, then there is congestion, and the congestion (or more exactly the strain) grows in proportion to the overload, u-B. This has been shown using a fluid model in the aforementioned document, "A new end-to-end probing and analysis method for estimating bandwidth bottlenecks", by B. Melander et al. The above-described behavior of the inter-packet strain is demonstrated in Equation 1 below.

$$\varepsilon = v + \begin{cases} 0 & (u < B) \\ \alpha(u - B) = \alpha u + \beta & (u \geq B) \end{cases} \quad (1)$$

In the model of Equation 1, $\alpha$ is a state variable equal to 1/C, $\beta$ is a state variable equal to (S/C)−1, and v is measurement noise. The available bandwidth is related to the state variables as $$B = -\frac{\beta}{\alpha}.$$

Thus, an estimate of the available bandwidth can be readily obtained if the state variables $\alpha$ and $\beta$ can be estimated.

Returning now to the idea of a filter-based approach, the state of a system is estimated from repeated measurements of some quantity dependent on the system state, given models of how the system state evolves from one measurement occasion to the next, and how the measured quantity depends on the system state. Both these dependencies include a random noise term, the process noise and the measurement noise, respectively. The system equations are then $$\begin{cases} x_k = f(x_{k-1}) + w_{k-1} \\ z_k = h(x_k) + v_k \end{cases} \quad (2)$$

where x is the state of the system, z is the measurement, w is the process noise and v is the measurement noise. The functions $f$ and h represent the system evolution model and the measurement model, respectively. The subscript refers to the "discrete time"

If the functions $f$ and h are linear, and if both the process noise and the measurement noise are Gaussian and uncorrelated, there is an optimal filter, namely the Kalman filter. Experience has shown that Kalman filters often work very well, even when these conditions are not strictly met. That is, the noise distributions do not need to be exactly Gaussian. A certain deviation from linearity of the functions $f$ and h can also be accommodated by the noise terms. Another important advantage with Kalman filters is that, unless the dimensionality of the system is very large, they are computationally light-weight, with minimal requirements on CPU and memory. In this linear case, the system can be expressed using matrices as follows:

$$\begin{cases} x_k = Ax_{k-1} + w_{k-1} \\ z_k = Hx_k + v_k \end{cases} \quad (3)$$

The Kalman filter equations allowing calculation of the new estimate from the previous estimate and the new measurement are:

$$\hat{x}_k = \hat{x}_k^- + K_k(z_k - H\hat{x}_k^-) \quad (4)$$

$$P_k = (I - K_k H)P_k^-$$

where $$\hat{x}_k^- = A\hat{x}_{k-1} \quad (5)$$

$$P_k^- = AP_{k-1}A^T + Q$$

$$K_k = P_k^- H^T (HP_k^- H^T + R)^{-1}. \quad (6)$$

Kalman filtering can be understood as a process where there are two phases of calculation in each iteration. First, there is a "prediction" phase, where the previous estimate evolves one discrete time step (Equation 5) according to the system model. Then, there is a "correction" phase, where the new measurement is taken into account (Equation 4). The updated error covariance matrix $P_k$ of the state estimate is also computed.

As can be seen from Equations 6 and 5, the Kalman gain $K_k$ increases with Q and decreases with R. These Kalman filter inputs Q and R are the covariances of the process noise w and measurement noise v, respectively. These quantities may be intuitively understood as follows. Large variations of the noise in the system model (high Q) means that the prediction according to the system model is likely to be less accurate, and the new measurement should be more heavily weighted. Large variations in the measurement noise (high R) means that the new measurement is likely to be less accurate, and the prediction should be more heavily weighted. Note that the measured quantity z=$\epsilon$ is a scalar, and R is also a scalar (or a 1×1 matrix).

Exemplary embodiments of the invention make use of a Kalman filter in order to produce an updated estimate of the available bandwidth over a network path for each new measurement. Each measurement includes sending a sequence of pairs of time-stamped packets, and calculating the average inter-packet strain. In some embodiments, the sequence of packet pairs may be coalesced into a train. The variance of the inter-packet strain is also computed to produce the R input for the Kalman filter equations. In some embodiments, the probing rate u is chosen randomly for each measurement, for example, according to a probability distribution such as a uniform distribution. In some embodiments, measurements are repeated after a time interval chosen randomly for each new measurement from a probability distribution, for example, a one-point distribution, where the interval one second is chosen with probability one.

It should be noted that the Kalman filter method is very "forgiving", and good results are often produced even when the ideal conditions are slightly broken. So, even if a system displays characteristics that deviate somewhat from this piecewise linear system curve, the resulting available bandwidth estimate is not automatically invalidated. Of course, all variables in this model are dynamical, i.e. may vary in time, so they depend on the subscript (which is sometimes suppressed in this exposition).

The model of Equation 1 is not linear, but it is piecewise linear. An example of this is shown graphically in FIG. 3. Although Kalman filters are not normally applicable in such cases, this problem is circumvented according to exemplary embodiments of the invention, and efficient convergence can be obtained. Even if the piecewise linear model used is only an approximation, the Kalman filter can still produce good estimates, as the noise terms can accommodate some errors due to "mismodeling". The model of Equation 1 allows for application of a Kalman filter, when the state of the system is represented by a vector containing the two parameters of the sloping straight line part of Equation 1.

$$x = \begin{bmatrix} \alpha \\ \beta \end{bmatrix}. \quad (7)$$

In order to fulfill the linearity criterion for applicability of Kalman filtering, some embodiments of the invention track u with respect to B, and attempt to stay on the sloping line part of Equation 1 (see also FIG. 3). Since the true value of B, the available bandwidth, is not known, exemplary embodiments of the invention use the most recent estimate $\hat{B}$, or some appropriate threshold value in the vicinity of $\hat{B}$. If u is smaller than this threshold, the measurement is disregarded and the estimate of the state vector is not updated. The measurement $\epsilon_k$ of the strain at discrete time k can be written as $$\epsilon_k = Hx_k + v_k \quad (8)$$

where H=[u 1]. Also, the evolution of the system state can be written as $$x_k = x_{k-1} + w_{k-1} \quad (9)$$

Thus, the Kalman filter formalism may be applied to the state vector of Equation 7, with A=I and z=$\epsilon$, where I is the Identity matrix.

The state vector x of Equation 7 is two-dimensional, so the covariance Q of the process noise w is a 2×2 matrix. This Q matrix may be used for performance tuning, given a reference network with controlled and known traffic and thus known available bandwidth. When applied to the two-dimensional state vector of Equation 7, the Kalman equations become computationally very simple, and only a few floating-point operations are needed at each iteration. When the filter estimates the system state variables α and β, the estimate $\hat{B}$ of the available bandwidth B is easily calculated from the estimates $\hat{\alpha}$ and $\hat{\beta}$, as $$\hat{B} = -\frac{\hat{\beta}}{\hat{\alpha}}.$$

Exemplary operations according to the invention are described in the numbered paragraphs below. These exemplary operations are also illustrated at 11-18 in FIG. 1.

1. The receiver makes an initial estimate $\hat{x}_0$ of the state vector, and an initial estimate $P_0$ of the error covariance matrix corresponding to $\hat{x}_0$, as shown at 11. From $\hat{x}_0$, an estimate $\hat{B}$ of the available bandwidth is computed, as shown at 12.

2. The sender sends a sequence (or train) of N probe packet pairs with probe traffic intensity u, according to a desired probability distribution, as shown at 13. (In some embodiments, the probability distribution for u is chosen based on past experience or experimentation.) The N probe packet pairs are used for inter-packet strain measurement. Some embodiments send a sequence of N+1 probe packets that are used to form N pairs of probe packets. That is, the second probe packet of the first pair is also used as the first probe packet of the second pair, and so on. In some embodiments, probe packets are not shared among the probe packet pairs, so a sequence of 2 N probe packets is used to form N distinct pairs of probe packets. The sender passes the current value of the probe packet traffic rate u to the receiver in the probe packets.

3. For the received sequence of probe packets, the receiver recovers the traffic intensity u from the probe packets, as shown at 14. If u exceeds a threshold value (for example, $\hat{B}$ or a value suitably chosen in the vicinity of $\hat{B}$) at 15, then the receiver uses the time stamps of the probe packets to compute the average ε of the N inter-packet strain values corresponding to the N pairs of packets, as shown at 16. The receiver also computes the covariance R. If u is less than or equal to the threshold value at 15, then the time-stamps of the probe packets are ignored, no update is performed, and operations return to #2 above, as shown at 18. 4. The Kalman filter uses the average inter-packet strain value and covariance matrix (if any) from operation 3 above to update the estimates of the state vector $\hat{x}$ and the error covariance matrix P, as shown at 17. From the new state vector estimate, a new estimate $\hat{B}$ of the available bandwidth is computed, as shown at 12.

5. Operations return to #2 above, and the next sequence of probe packets is generated, as shown at 13.

Figure 2:
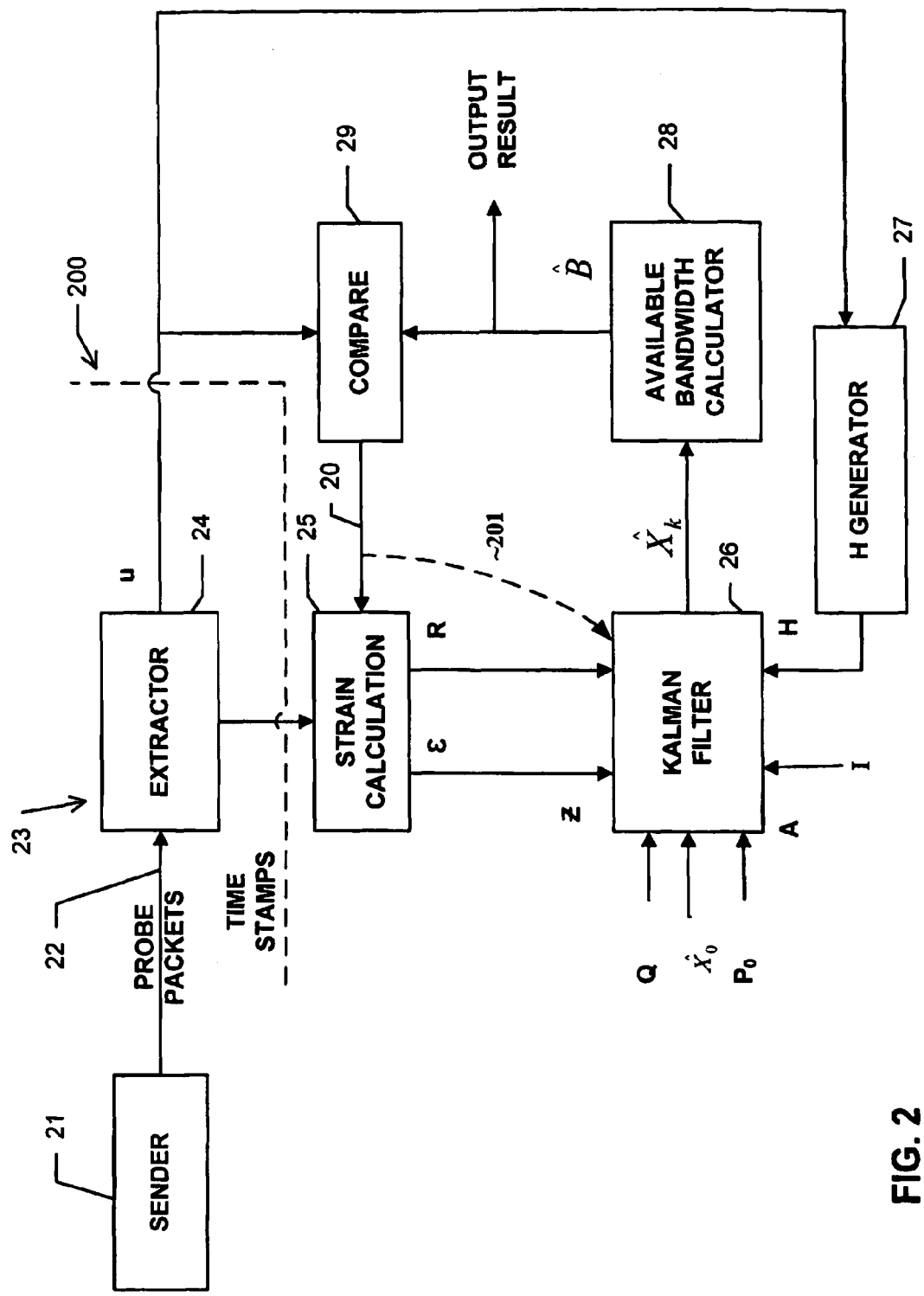
FIG. 2 diagrammatically illustrates an apparatus for evaluating a data transfer path according to exemplary embodiments of the invention.

FIG. 2 diagrammatically illustrates an apparatus for evaluating a data transfer path according to exemplary embodiments of the invention. In some embodiments, the apparatus of FIG. 2 is capable of performing operations described above and illustrated in FIG. 1. In some embodiments, the nodes 21 and 23, and the data transfer path 22, can constitute, or form a part of, a packet-switched data network, such as the Internet, a private intranet, etc. The sending node 21 sends sequences of probe packet pairs through the data transfer path 22 to the receiving node 23. The aforementioned time stamping at the sending and receiving nodes is not explicitly shown. The receiving node 23 includes an extraction unit 24 that extracts the time stamp information and the probe packet rate u from the probe packets. A strain calculation unit 25 calculates the inter-packet strain value of each pair of probe packets in the received sequence, and also calculates the average and variance of the inter-packet strain values.

The strain calculation unit 25 provides the average inter-packet strain ε as the z input to a Kalman filter 26, and also provides the inter-packet strain variance R as an input to the Kalman filter 26. The Kalman filter 26 also receives as inputs the Q matrix, and the initial estimates of the state vector $\hat{x}_0$ and the error covariance matrix $P_0$. In some embodiments, the initial estimates of the state vector $\hat{x}_0$ and the error covariance matrix $P_0$ are derived from past experience or experimentation. The accuracy of these initial estimates is not a significant factor in the operation of the Kalman filter.

The Kalman filter 26 receives the identity matrix I as its A matrix input, and also receives the matrix H (e.g., H=[u 1]) from a matrix generator 27 that produces matrix H in response to the probe packet rate u as extracted from the probe packets by extraction unit 24. In response to its inputs, the Kalman filter 26 produces the updated state vector estimate $\hat{x}_k$. An available bandwidth calculation unit 28 uses the updated state vector estimate to update the available bandwidth estimate $\hat{B}$. The available bandwidth estimate $\hat{B}$ is provided as an output result from the node 23, and is also provided to a compare unit 29 that compares the probe packet rate u to a threshold value that is equal to or suitably near $\hat{B}$. Depending on the result of this comparison, the compare unit 29 provides to the strain calculation unit 25 an indication 20 of whether or not the strain calculation unit 25 should make its calculations for the current sequence of probe packet pairs. In some embodiments, the indication 20 is provided to the Kalman filter 26, to signal whether or not the filter should be applied to the result of the strain calculation unit 25. This is shown by broken line 201.

From the foregoing description of FIG. 2, the extraction unit 24 and the strain calculation unit 25 can be seen as components of a data production unit that ultimately produces estimation data (ε and R in the example of FIG. 2) for use in estimating the available bandwidth. Also, the Kalman filter 26 and the available bandwidth estimator 28 can be seen as components of an estimation unit that applies Kalman filtering to the estimation data in order to produce the estimate of the available bandwidth.

Some embodiments are tunable to optimize the tracking performance at a desired available bandwidth-averaging time scale tau. For example, if tau=10 seconds, then the available bandwidth measurements are made over a 10-second time scale. In some embodiments, tau=10 seconds, and the 2×2 matrix Q has values of $Q11=10^{-5}$, $Q12=0$, $Q21=0$, and $Q22=10^{-3}$. In embodiments with shorter time scales, the value of Q22 may be increased, while maintaining Q11, Q12 and Q21 the same.

Some embodiments use scaling in the numerical calculations, so that the quantities involved are dimensionless. As mentioned above, ε is dimensionless to start with, and thus β, v and R are also dimensionless. In order to make all other quantities dimensionless, the probe traffic rate u is scaled by the maximum capacity of the first hop from the probe sender host/node. This means that u=1 is the maximum possible probing rate, and that α, x, w and Q are dimensionless.

In some embodiments, the components at 25-29 of FIG. 2 are provided externally of and separate from the receiving node 23, but are coupled to the extraction unit 24 to receive therefrom the time stamp information and the probe packet rate u. This type of partitioning is illustrated by broken line 200 in FIG. 2. In this partitioning example, all of the components 25-29 are provided externally of and separate from the receiving node 23, for example, in one or more other nodes of the network.

The present invention can produce an updated estimate of the available bandwidth for each new sampling of the system, i.e. for each new train of probe packet pairs. The trains may be sent arbitrarily often (i.e., the time scale for the sampling measurement can be reduced arbitrarily), so the available bandwidth may be tracked in real time.

Data processing and memory requirements for performing the above-described filtering calculations can be met relatively easily. For example, in some embodiments the receiving node 23 of FIG. 2 is a microprocessor platform. The update of the available bandwidth estimate using the Kalman filter equations reduces to performing only a few floating-point operations (closer to 10 than to 100 in some embodiments). There is no need to save historical data, because only the previous state vector estimate and the new measurement are needed to calculate the updated state vector estimate.

It will be evident to workers in the art that, in various embodiments, the invention can be implemented in hardware, software, or a combination of hardware and software.

Although exemplary embodiments of the invention have been described above in detail, this does not limit the scope of the invention, which can be practiced in a variety of embodiments.

What is claimed is:

1. A method of evaluating a condition in a data transfer path that transfers data between data communication nodes of a data network, comprising:
   receiving at a data production unit probe packets that traverse the data transfer path during real-time operation of the data transfer path;
   in response to traversal of the data transfer path by said probe packets, and during said real-time operation of the data transfer path, the data production unit using information from said probe packets to provide estimation data for use in estimating the condition, the condition being available bandwidth in the data transfer path; and
   producing at an estimation unit coupled to the data production unit an estimate of the condition during said real-time operation of the data transfer path, including applying a filter operation to said estimation data during said real-time operation of the data transfer path, wherein said applying step includes using a Kalman filter, wherein said applying step including using a state vector that corresponds to a characteristic exhibited by said estimation data, and wherein said characteristic is piecewise linearity.

2. The method of claim 1, including performing one of said producing step and said applying step only in instances where the associated estimation data corresponds to a predetermined one of a plurality of linear portions of said piecewise linear characteristic.

3. The method of claim 2, wherein the condition is available bandwidth in the data transfer path, wherein said receiving step includes receiving a sequence of said probe packets into the data transfer path at a predetermined rate, and wherein said predetermined one of said linear portions corresponds to a situation where said predetermined rate is larger than a current estimate of said available bandwidth.

4. The method of claim 1, wherein said receiving step includes receiving a sequence of said probe packets into the data transfer path at a predetermined rate, and including providing within one probe packet of said sequence information indicative of said predetermined rate.

5. The method of claim 4, wherein said receiving step includes receiving a plurality of said sequences of probe packets into the data transfer path at a plurality of respectively corresponding rates, and wherein said producing step includes producing estimates of the condition that respectively correspond to some of said sequences.

6. An apparatus for evaluating a condition in a data transfer path that transfers data between data communication nodes of a data network, comprising:
   a data production unit for receiving probe packets that have traversed the data transfer path during real-time operation of the data transfer path, said data production unit responsive to traversal of the data transfer path by said probe packets and using information from said probe packets, producing, during said real-time operation of the data transfer path, estimation data for use in estimating the condition; and
   an estimation unit coupled to said data production unit for producing an estimate of the condition during said real-time operation of the data transfer path, said estimation unit including a filter for applying a filter operation to said estimation data during said real-time operation of the data transfer path, wherein said filter includes a Kalman filter, and the condition is available bandwidth in the data transfer path, wherein said estimation data exhibits a piecewise linear characteristic, and said filter uses a state vector that corresponds to said piecewise linear characteristic.

7. The apparatus of claim 6, wherein said filter is adapted to apply said filter operation only if said estimation data corresponds to a predetermined one of a plurality of linear portions of said piecewise linear characteristic.

8. The apparatus of claim 6, wherein said data production unit is configure to produce only instances of said estimation data that correspond to a predetermined one of a plurality of linear portions of said piecewise linear characteristic.

9. The method of claim 1, including providing a time stamp for each of said probe packets immediately before and after traversal of the data transfer path.

10. The apparatus of claim 6, wherein said estimation unit and a portion of said data production unit are located physically separately from a remainder of said data production unit.

* * * * *

UNITED STATES PATENT AND TRADEMARK OFFICE
CERTIFICATE OF CORRECTION

PATENT NO. : 7,778,179 B2
APPLICATION NO. : 11/285723
DATED : August 17, 2010
INVENTOR(S) : Ekelin et al.

Page 1 of 1

It is certified that error appears in the above-identified patent and that said Letters Patent is hereby corrected as shown below:

In Column 4, Line 34, delete "εcan" and insert -- ε can --, therefor.

In Column 4, Line 51, delete "αis" and insert -- α is --, therefor.

In Column 5, Line 12, delete "ƒand" and insert -- ƒ and --, therefor.

In Column 5, Line 14, delete "time"" and insert -- time". --, therefor.

In Column 7, Line 24, delete " $\hat{B}of$ " and insert -- $\hat{B}$ of --, therefor.

Signed and Sealed this
Eleventh Day of January, 2011

David J. Kappos
*Director of the United States Patent and Trademark Office*